(No Model.)
W. W. BOUGHNER.
LAWN MOWER GRINDER.
No. 606,117. Patented June 21, 1898.
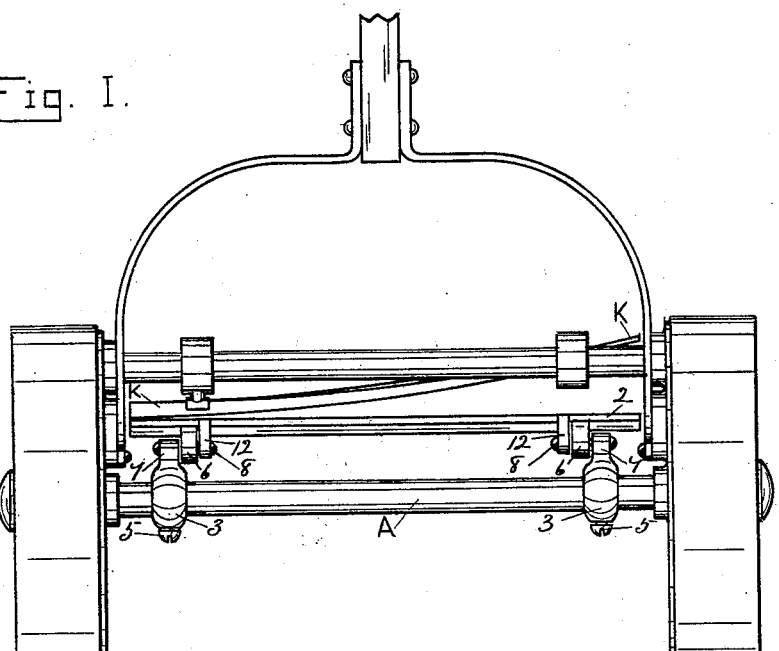
Fig. I.
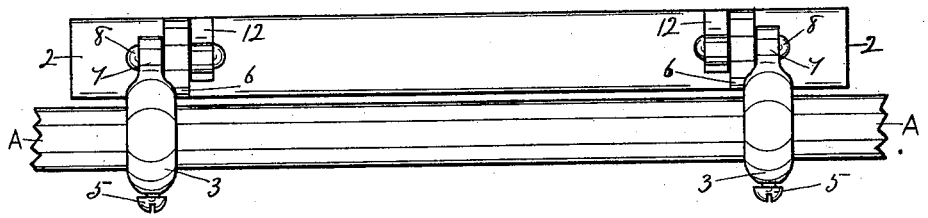
Fig. II.
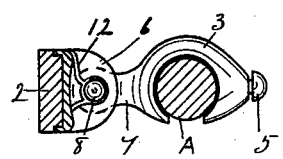
Fig. III.
Fig. IV.
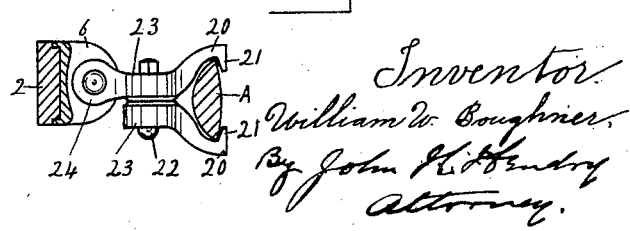
Witnesses
B. E. Herald
A. McPherson
Inventor
William W. Boughner,
By John K. Hendry
Attorney.

UNITED STATES PATENT OFFICE.

WILLIAM W. BOUGHNER, OF HAMILTON, CANADA.

LAWN-MOWER GRINDER.

SPECIFICATION forming part of Letters Patent No. 606,117, dated June 21, 1898.

Application filed July 19, 1897. Serial No. 645,079. (No model.)

*To all whom it may concern:*

Be it known that I, WILLIAM W. BOUGH-NER, a citizen of Canada, residing at Hamilton, in the county of Wentworth, in the Province of Ontario, Canada, have invented new and useful Improvements in Lawn-Mower Grinders, of which the following is a specification.

My invention consists of a horizontal emery-bar hinged or pivoted to certain clips or clamps which are capable of adjustment on the binding-bar or axle of the mower in order that the revolving knives of the mower may engage with said emery-bar for grinding or sharpening said knives.

The objects of my invention are, first, to provide means for grinding the knives of a lawn-mower in a most thorough and satisfactory manner, and, second, to afford facilities for the proper and expeditious manner of attaching the device and of adjusting the same to grinding position on the mower.

In the drawings, Figure 1 is a plan of my knife-grinding device attached to the binding-bar or axle of a lawn-mower, showing one section or knife of the revolving spiral knives and the fore part of the knife engaging with the emery-bar. Fig. 2 is an enlarged view of the device detached, and Fig. 3 is an end elevation of the grinding device. Fig. 4 is an end view and modification of Fig. 3, the binding-bar of the mower being of a rounded flat section. Hence the clip is made to suit said binding-bar.

In order to more fully understand my device, I will indicate the one revolving spiral knife shown of a lawn-mower by K and the binding-bar or axle of the mower by A. To this binding-bar or axle A the emery or grinding bar 2 is attached by means of its clips 3, which are capable of turning either way on said binding-bar, therefore adjustable and held in approved position by their set-screws 5, which screw against the said bar or axle. The emery-bar 2 is connected to its clips 3 by means of lugs 6 on said bar and lugs 7 on said clips as hinges, with pivotal pins 8. This pivoting or hinging of the emery-bar to the binding-bar A of a mower by means of the adjustable clips is a very important element in my invention by the fact that the face of the emery-bar is allowed to adjust itself to the revolving spiral knives of the mower. As these spiral knives revolve when being ground the fore end of one knife engages with the emery-bar at the same time as the latter end of the adjoining knife, and so on. It will be observed that the said clips will be of sufficient size to allow them to be attached to varying diameters of the binding-bars or axles of mowers in order to obviate any difficulty in attachment. This hinged emery-bar on account of its operation in conjunction with adjustable clips possesses an almost universal capability.

It will be perceptible that the emery-bar can be brought to bear against the revolving knives of the mower when the distance is very slight between said knives and the binding-bar or axle. This is accomplished by the adjustable clips on said binding-bar and the pivotal centers of the emery-bar.

In order to bring the upper edge of the emery-bar into close proximity to the knives, springs 12 are provided on the pivotal pins 8 to engage with the upper and rear parts of the emery-bar. These springs give and allow a certain tension and stability to the said emery-bar when grinding. It will not be absolutely necessary to detach this grinding device from the mower when the said grinding-bar is not being used, as the same may be turned back on its pivots or hinges out of the way of the revolving knives of the mower. This is an important feature of my invention. The emery or material composing this grinding-bar 2 may be partially incased—that is, in a casing which allows the face and the outer part of the sides or edges of the inserted emery or grinding material to be exposed. This emery-bar casing is seen more fully in the enlarged views of the drawings and indicated by 16 with its rear lugs 6.

When the binding-bar of a lawn-mower is of a non-circular section, then the modification as shown in Fig. 4 of the drawings may be used. Each jaw 20 of the clip has inner lips 21, which clip and fasten to a binding-bar, by means of the bolt 22, through outer ears 23. One of these ears has a lug 24, to which is hinged the emery-bar in a similar manner as the clips previously referred to.

Various changes in the form, proportion, and minor details of my invention may be resorted to without departing from the spirit and scope thereof. Hence I do not consider myself limited to the precise construction as herein shown and described, especially in the particular and precise formation of the clips and grinding-bar, but believe that I am entitled to all such variations as come within the terms as set forth.

I am aware that lawn-mower grinders are not new. These I do not claim; but

What I do claim as my invention, and desire to secure by Letters Patent, is—

A lawn-mower-knife grinder of the character described consisting of a horizontal emery-bar having rear lugs, clips capable of adjustment and fastening to the binding-bar, or axle of a lawn-mower and pivoted to the said rear lugs of the emery-bar and springs on said pivotal connections to engage with the rear part of said emery-bar to give tension to same when grinding, as described.

WILLIAM W. BOUGHNER.

Witnesses:
B. E. HERALD,
WALTER SOULES.